(12) United States Patent
Sasano

(10) Patent No.: US 6,555,786 B2
(45) Date of Patent: Apr. 29, 2003

(54) WELDING MACHINE MANIPULATED BY AUTOMATED EQUIPMENT

(75) Inventor: Yoshiro Sasano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/772,375

(22) Filed: Jan. 30, 2001

(65) Prior Publication Data
US 2002/0011474 A1 Jan. 31, 2002

(30) Foreign Application Priority Data

Jan. 31, 2000  (JP) ........................................ 2000-021649

(51) Int. Cl.⁷ ................................................ B23K 9/12
(52) U.S. Cl. ............................. 219/137.71; 219/125.1; 901/42
(58) Field of Search ........................ 219/137.71, 125.1, 219/125.11, 124.34, 130.5, 137 R; 901/42

(56) References Cited

U.S. PATENT DOCUMENTS

| | | | | |
|---|---|---|---|---|
| 2,525,657 A | * | 10/1950 | Diller ..................... | 219/137 R |
| 3,267,251 A | * | 8/1966 | Anderson ................. | 219/125.1 |
| 4,163,886 A | * | 8/1979 | Omae et la. ............ | 219/125.11 |
| 4,647,753 A | * | 3/1987 | Nakashima et al. ..... | 219/125.1 |
| 5,148,000 A | * | 9/1992 | Tews ..................... | 219/125.11 |
| 5,510,596 A | * | 4/1996 | Xu et al. ................ | 219/124.34 |
| 5,614,116 A | * | 3/1997 | Austin et al. .................. | 901/42 |

* cited by examiner

Primary Examiner—Clifford C. Shaw
(74) Attorney, Agent, or Firm—RatnerPrestia

(57) ABSTRACT

A welding machine manipulated by automated equipment controls feeding of depositing metal independently of controlling a welding current, so that the welding can be finely controlled and quality welding is achievable. The welding machine includes a robot having an arm for moving a welding torch, a robot controller for controlling the movement of the robot, a welding power source coupled to the torch, a depositing metal feeder for feeding depositing metal to the welding torch, and a feeder controller for controlling the feeder. The robot controller is coupled to the feeder controller for transmitting a control signal, related to feeding the depositing metal, to the feeder controller.

10 Claims, 3 Drawing Sheets

| MOVE   P1 | AMO   350 | FSPD   3000 |
| MOVEL  P2 | VOLT  23.5 | FSPDR  10 |
| MSPD   1.5 | GAS   ON | FSTP |
| WAIT   0.5 | ARC   ON | FSTRT |
| . | . | FWVR + 10 1.5 −10 1.0 |
| . | . | . |
| . | . | . |

```
MSPD   30
MOVE   P1
GAS    ON
AMP    300
VOLT   25.0
MSPD   1.0
WAIT   0.5
ARC    ON
MOVEL  P2
AMP    350
MOVEL  P3
FWVR + 10 1.5 –10 1.0
       .
       .
       .
```

WELDING MACHINE MANIPULATED BY AUTOMATED EQUIPMENT

FIELD OF THE INVENTION

The present invention relates to a welding machine of which welding tool, such as a welding torch, is moved by automated equipment such as a robot. More particularly, it relates to a welding machine manipulated by the automated equipment and performing arc welding using a consumable electrode.

BACKGROUND OF THE INVENTION

In arc welding, it is important to move a welding torch maintaining a relative position between a work-piece and the welding torch. Welding by a robot has an advantage of higher speed over welding by holding a torch with a worker's hand (hereinafter referred to as "manual welding"). Reproducibility in repeating operations is also important in welding. Regarding high-speed-welding in particular, which allows little tolerance for disperse of relative positional relation between the work-piece and the welding torch, the manual welding cannot deal with it but a robot welding can do it. As a result, welding machines manipulated by automated equipment expand their application extensively.

A case of gas shielded metal arc welding, which uses a dc power source having a constant voltage characteristic as a welding power source, and also uses a consumable electrode as a welding electrode, is described hereinafter.

A voltage at an electrode is dependent both on an arc voltage and a weld-electrode-resistance, so that an amount of heat given to the welding electrode is controlled by a welding current. Heat generated melts metal, so that supply quantity of depositing metal is determined with respect to the current. In other words, when an arc voltage and a wire extension remain constant, the welding current is determined by a supply quantity of the depositing metal (=welding wire). A voltage supplied to the electrode is referred to as a welding voltage. This welding voltage and the welding current are controlled by a welding controller. The welding manipulated by automated equipment such as a robot has been controlled basically in the same way as the manual welding.

If the heat amount generated is constantly used for melting the depositing metal, uniform welding is always expected. However, there are the following abnormal cases: a work-piece has a gap and the gap is uneven, or a thickness of the material constituting the work-piece varies depending on spots, or a member of greater heat capacity is disposed near a groove and thus the heat is absorbed unevenly. For these cases, an amount of depositing metal supplied should be finely controlled responsive to the heat amount generated depending on spots along a weld line.

FIG. 3 shows a depositing metal feeder. In FIG. 3, welding wire 12 wound on spool 11 is pulled out, then fed to a welding torch (not shown) by wire feeder 14 driven by motor 13. Motor 13 is powered through cable 15, which also couples motor 13 to a controller (not shown). Cable 15 transmits a control signal, e.g., an armature voltage signal in addition to powering motor 13. Spool 11 is held by base 17, and wire feeder 14 as well as driving motor 13 is held by base 18.

FIG. 6 shows a control system of a conventional depositing metal feeder. Depositing metal feeder 21, detailed in FIG. 3, is controlled its feeding of the depositing metal by feeder controller 22 via cable 15. Feeder controller 22 follows a signal transmitted via cable 25 from welding controller 24 built in welding power source 23, and controls feeder 21. In other words, feeder 21 is controlled by welding controller 24 built in power source 23. Welding wire 12 is fed to the welding torch (not shown) to be welded. Power cable 16 supplies a welding current and a welding voltage from welding power source 23 to the welding torch. In general, power cable 16 transits wire feeder 14 and is led to the torch by a torch cable (not shown). Welding power source 23 is powered from outside via input cable 26.

As discussed above, in the conventional control system of the depositing metal, welding power source 23 powers the torch, while welding controller 24 built in power source 23 controls the wire feeding. Therefore, fine control, such as varying the supplying amount of the depositing metal responsive to the heat amount generated depending on spots along the weld line, could not be expected.

SUMMARY OF THE INVENTION

A welding machine is manipulated by automated equipment, where the automated equipment can control a supplying amount of depositing metal while a welding controller controls a welding current and a welding voltage during the welding. A welding machine in an exemplary embodiment of the present invention comprises the following elements:

(a) automated equipment for moving a welding tool relative to a work-piece;

(b) an equipment controller for controlling the automated equipment;

(c) a depositing metal feeder for feeding the depositing metal to a weld point nearby the welding tool; and (d) a depositing metal feeder controller for controlling the depositing metal feeder.

In the construction discussed above, the equipment controller is coupled to the feeder controller so that a signal related to feeding the depositing metal is transmitted from the equipment controller to the feeder controller.

This structure allows a feeding amount of the depositing metal to be controlled by the information of a fed amount of the depositing metal on the equipment controller side in addition to the information about a welding current and a welding voltage supplied from a welding controller on a welding power source side. Therefore, an optimum welding condition for respective weld points along a weld line is obtainable. As a result, quality welding can be achieved.

DETAILED DESCRIPTION OF THE PREFERRED EMBODIMENT

Figure 1:
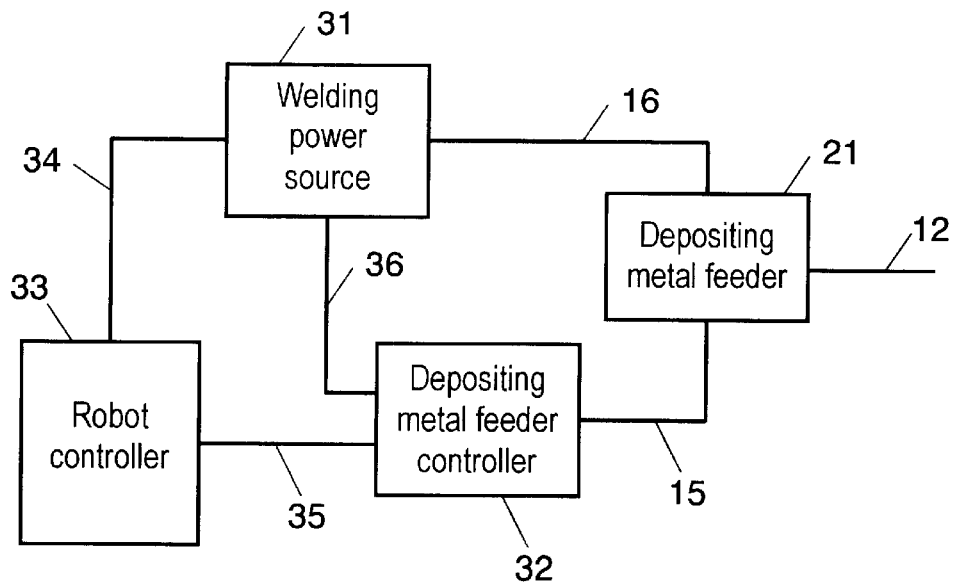
FIG. 1 is a block diagram illustrating a control system of feeding depositing metal in accordance with an exemplary embodiment of the present invention.
Figures 5, 6:
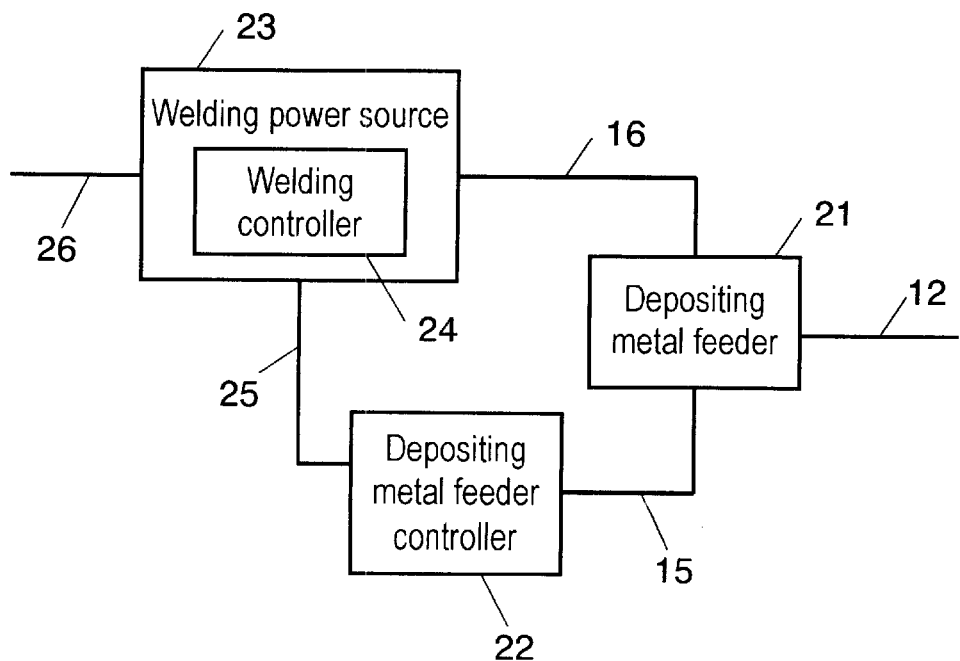
FIG. 5 is a coding sheet describing a major part of a specific case of system control when the robot is used as the automated equipment in an exemplary embodiment of the present invention.
FIG. 6 is a block diagram illustrating a control system of a conventional depositing metal feeding.

A preferred embodiment of the present invention is demonstrated hereinafter using a robot as automated equipment. FIG. 1 shows a control system of a depositing metal feeder of the present invention. Depositing metal feeder 21 is the same product as shown in FIG. 6 where conventional case is illustrated. Feeder 21 is coupled to depositing metal feeder controller 32 via control cable 15, and also coupled to welding power source 31 via power cable 16. Power cable 16 transits feeder 21 as same as the conventional case, and is coupled to a welding torch (not shown) via a torch cable (not shown) to power the torch for arc welding. Welding power source 31 is coupled to robot controller 33 via cable 34, and further coupled to feeder controller 32 via cable 36. Feeder controller 32, on the other hand, is coupled to robot controller 33 via cable 35.

Figure 2:
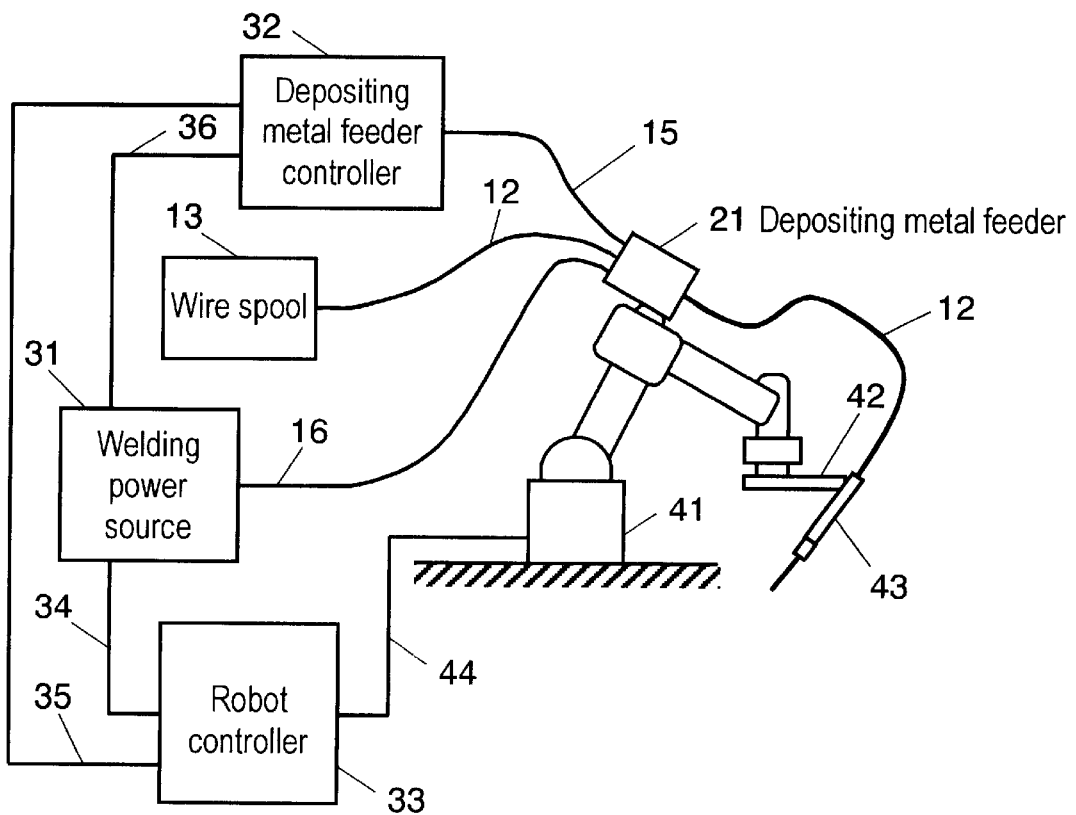
FIG. 2 shows a system structure, where a robot is used as automated equipment of the present invention.

FIG. 2 illustrates an entire welding machine manipulated by automated equipment, where feeder 21 and its control system shown in FIG. 1 are coupled to robot 41. In other words, feeder 21 is mounted to robot 41, welding torch 43 is mounted to arm 42 of robot 41, and feeder 21 feeds depositing metal 12 to torch 43. Depositing metal is protected and guided by a flexible conduit, and reaches torch 43. Robot 41 is coupled to robot controller 33 via cable 44, and robot controller powers robot 41 as well as communicates with robot 41 by sending/receiving various signals.

An operation of the welding machine of the present invention is demonstrated with reference to FIGS. 1, 2, 4 and 5. When robot 41 is actuated, arm 42 moves torch 43 to a weld starting point. A predetermined welding voltage is applied to torch 43, and depositing metal is fed so that a predetermined welding current is obtained. A normal welding is thus performed. The welding command for carrying out this normal welding has been taught to the robot, and robot controller 33 instructs power source 31 with this command, thereby carrying out the welding in a predetermined condition.

In progress of the welding, robot controller 33 instructs directly feeder controller 32 to add an amount of the depositing metal. Feeder controller 32 follows the instruction and varies the depositing metal quantity so that proper welding is performed at a wide groove gap. Not only the wide groove gap, but also other abnormal places to be welded—such as an irregular groove shape, a welding spot requiring an abnormal heat amount, a sharp curve of a weld line—can be welded constantly at a high quality level by executing the commands varying an amount of the depositing metal.

Typical commands related to actions of the robot, controlling the welding power source and controlling the feeding of the depositing metal are described with reference to FIG. 4. These commands are taught to and stored in the robot controller.

Figures 3, 4:
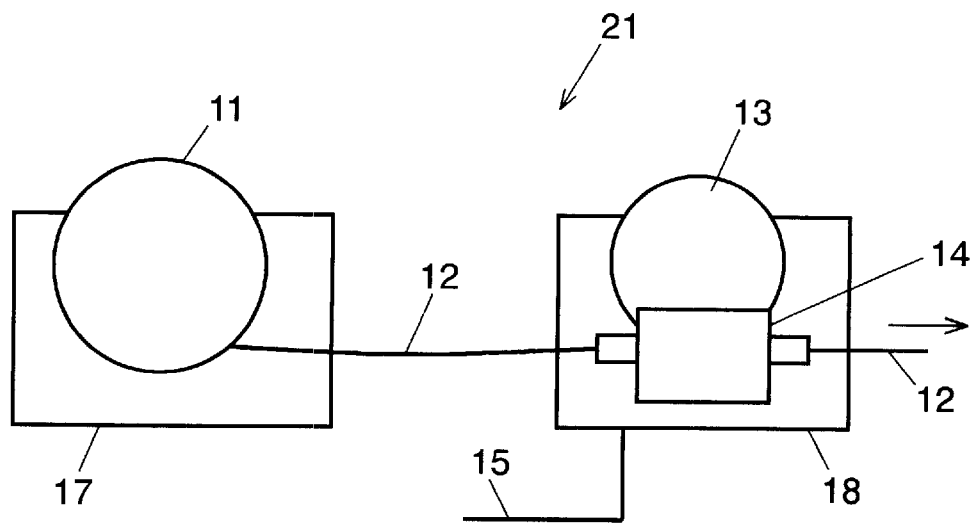
FIG. 3 shows a construction of a depositing metal feeder.
FIG. 4 shows tables listing major commands used for manipulating a robot as the automated equipment in an exemplary embodiment of the present invention.

The left side table in FIG. 4 lists the command instructing the robot to move. "MOVE P1" is a command of "Move an effect point of the robot to point P1 stored in the robot." In the case of the present invention, the effect point means a tip of the torch. The command of "MOVEL P2" means "Move linearly the torch's tip held by the robot to position P2." "MSPD" is a command of instructing the torch's tip to move at a certain speed. "MSPD 1.5" is a command for the tip to move at a speed of 1.5 m/minute. "WAIT" is a command of designating a time when the tip stops moving. "WAIT 0.5" instructs the tip to halt for 0.5 seconds.

The center table in FIG. 4 lists the commands related to the welding. The command "AMP" designates a welding current, and "AMP 350" designates the current to be 350A. The command "VOLT" designates a welding voltage, and "VOLT 23.5" designates the voltage to be 23.5V. "GAS ON" instructs to start feeding shielding gas, and "GAS OFF" instructs to stop feeding the gas. "ARC ON" instructs to start arc welding, and "ARC OFF" instructs stop the arc welding.

The right side table in FIG. 4 lists the commands related to controlling the feeding of the depositing metal (welding wire.) "FSPD" designates a feeding speed of the depositing metal, and "FSPD 3000" instructs the depositing metal to be fed at a speed of 3000 mm/minute. "FSPDR" designates a rate of varying the feeding speed, and "FSPDR 10" instructs to increase the feeding speed by 10%. "FSTP" instructs to stop feeding the depositing metal, and "FSTRT" instructs to start feeding. "FWVR" varies the feeding speed intermittently and repeats this variation, and the command of "FWVR+10 1.5–10 1.0" means "Increase the feeding speed determined by a given welding current by 10% and hold that speed for 1.5 seconds, then reduce the speed by 10% and hold it for one second, and repeat this sequence." The commands on the right side table can be executed independently of the commands listed in the center table.

One example using these commands shown in FIG. 4 is described in the coding sheet shown in FIG. 5. In this coding sheet, the command of "MSPD 30" designates a moving speed of torch's tip at 30 m/min, and "MOVE P1" moves the tip to point P1. "GAS ON" starts feeding the shielding gas. "AMP 300, VOLT 30, MSPD 1.0" means "welding current= 300A, welding voltage=30V, and move the torch at a speed of 1 m/min." "WAIT 0.5, ARC ON, MOVEL P2" means "Halt, and start the arc welding in 0.5 sec, then move the torch linearly to point P2." "AMP 350, MOVEL P3" means "Change the welding current to 350A, and move the torch linearly to point P3. Further, "FWVR+10 1.5–10 1.0" means "Increase the feeding speed by 10% and hold the speed for 1.5 sec, then reduce the feeding speed by 10% and hold it for one second, and repeat this sequence."

The execution of command "FWVR+10 1.5–10 1.0" allows the depositing metal fed to be welded faster (10% in this case) for a given time (in this case for 1.5 seconds) and slower (10% in this case) for a given time (in this case for 1.0 second), and the welding is continued by repeating this sequence. As such, when the feeding speed is varied in the welding performed on a plate, a scale pattern is formed on weld bead formed on the plate.

When such welding as varying the feeding speed of depositing metal is performed, for instance in a horizontal fillet welding, the feeding speed variation is synchronized with a weaving cycle by a robot arm, so that leg lengths in a horizontal and a vertical directions can be uniformed and an even throat thickness can be obtained.

Controlling of the feeding speed of the depositing metal during the actual welding is discussed above, and controlling of the feeding speed during non-welding period is described hereinafter.

When a servo-motor is used for driving the feeding mechanism of the depositing metal, not only a motor speed but also a rotational angle of the motor can be controlled. If the rotational angle of the motor can be accurately controlled, lengths of wire extension and retraction from the welding torch can be accurately controlled.

Regarding a contact sensor by the known wire-grounding method, the robot arm ups and downs the torch so that the welding wire contacts a work-piece. This is a conventional wire-grounding method. Instead of moving the robot arm up and down, the welding wire is extended and retracted repeatedly, thereby realizing the contact sensor of the wire-grounding method. Since the robot arm has a large mass and a great inertia, there is a limit for performing high-speed and highly accurate sensing. On the other hand, since the welding wire has a light weight, extension and retraction at high speed can be realized and its small inertia makes a stop error small. As a result, highly accurate sensing can be achieved. This also prevents the robot from bearing a large load, thus the durability of the robot can be improved.

When the wire is controlled as a contact sensor by the wire-grounding method, cable 34 between robot controller 33 and welding power source 31 is not used.

The description discussed above is referred to the welding using a consumable electrode with a welding power source of constant voltage characteristic. However, even in the welding using non-consumable electrode with a welding power source of constant current characteristic, if filler wire is employed as the depositing metal, the present invention can be applied as it is. The filler wire is supplied to nearby the tip of the welding torch.

This embodiment proves that the welding machine manipulated by the automated equipment can set a feeding speed of depositing metal independently of controlling a welding current and a welding voltage. Thus the quantity of the depositing metal can be varied at abnormal welding points such as non-uniformed groove shapes, a point requiring an abnormal heat amount, and a sharp weld-line curve. As a result, quality welding can be expected. Further, instead of moving a robot arm up and down, the wire is extended and retracted repeatedly, thereby realizing a contact sensor according to the wire-grounding method. As a result, a highly accurate sensing can be achieved, and a robot can be prevented from bearing a large load.

What is claimed is:

1. A welding machine for performing welding on a workpiece, said welding machine comprising:
    a metal feeder for feeding depositing metal;
    a controller for controlling feeding rate at which said metal feeder feeds said depositing metal; and
    a memory for storing;
    a first plurality of commands which specify changes to said feeding rate between and away from starting and stopping of welding; and
    a second plurality of commands which specify welding locations;
    each of said second plurality of commands associated with a respective one of said first plurality of commands.

2. The welding machine as defined in claim 1, wherein said equipment controller is coupled to a welding power source for transmitting at least one of the control signal and another control signal related to feeding the depositing metal from said power source to said feeder controller.

3. The welding machine as defined in claim 1, wherein said feeder controller is disposed in a power source.

4. The welding machine as defined in claim 1, wherein the control signal corresponding to at least one of a feeding speed and a feeding quantity of the depositing metal is transmitted to said feeder controller.

5. The welding machine as defined in claim 1, wherein said equipment controller has a welding power source controlling command and a depositing metal feeding controlling command, and these two commands are independently stored and independently supplied.

6. A welding machine according to claim 1, wherein said second plurality of commands initiate movement relative to said welding locations.

7. A method of welding, said method comprising the steps of:
    storing a first plurality of commands which specify changes to said feeding rate between and away from starting and stopping of welding; and
    a second plurality of commands which specify welding locations;
    each of said second plurality of commands associated with a respective one of said first plurality of commands;
    welding at a first rate based on one of said first plurality of commands; and
    changing welding locations based on one of said second plurality of commands;
    changing welding to a second rate after said first rate based on another of said first plurality of commands associated with said one of said second plurality of commands while welding is still occurring.

8. A method of welding according to claim 7, further comprising the step of changing welding to said first rate after welding at said second rate based on yet another of said commands.

9. A method of welding according to claim 8, further comprising the step of changing welding to a third rate which is different than said first and second rate after welding at said second rate based on yet another of said commands.

10. A method of welding according to claim 7, wherein said second plurality of commands initiate movement relative to said welding locations.

* * * * *